United States Patent [19]

Brandes et al.

[11] Patent Number: 5,585,441
[45] Date of Patent: Dec. 17, 1996

[54] ELASTOMER - MODIFIED THERMOPLASTIC OLEFIN POLYMER COMPOSITIONS

[75] Inventors: Ellen B. Brandes, Plainsboro; Margaret D. Monahan, Summit; Steven L. Schafer, Flemington, all of N.J.

[73] Assignee: Mobil Oil Corporation, Fairfax, Va.

[21] Appl. No.: 446,163

[22] Filed: May 22, 1995

[51] Int. Cl.$^6$ ............................. C08L 23/10; C08L 9/00; C08L 47/00; C08L 53/00
[52] U.S. Cl. .......................... 525/193; 525/232; 525/194; 525/192; 525/901
[58] Field of Search ................... 525/192, 194, 525/232, 333.2, 901, 193

[56] References Cited

U.S. PATENT DOCUMENTS

| | | | |
|---|---|---|---|
| 2,832,748 | 4/1958 | Stafford et al. | 260/45.5 |
| 2,834,751 | 5/1958 | Jones | 525/192 |
| 2,877,206 | 3/1959 | Scott | 525/192 |
| 3,985,826 | 10/1976 | Futamura | 260/876 |
| 4,020,125 | 4/1977 | Suzuki et al. | 260/859 R |
| 4,442,233 | 4/1984 | Lamar et al. | 525/232 |
| 4,880,878 | 11/1989 | Himes et al. | 525/89 |
| 4,968,747 | 11/1990 | Mallikarjun | 525/74 |
| 4,980,421 | 12/1990 | Teramoto et al. | 525/233.2 |
| 5,023,300 | 6/1991 | Huff et al. | 525/194 |
| 5,034,449 | 7/1991 | Mallikarjun | 525/504 |
| 5,229,462 | 7/1993 | Bauer et al. | 525/232 |
| 5,270,394 | 12/1993 | Hoxmeier | 525/232 |
| 5,393,843 | 2/1995 | Handlin et al. | 525/333.2 |

*Primary Examiner*—Carman J. Seccuro, Jr.
*Attorney, Agent, or Firm*—Ronald A. Bleeker; Malcolm D. Keen

[57] ABSTRACT

A thermoplastic composition comprising a crystalline propylene polymer and as a modifying elastomer, a hydrogenated butadiene polymer which is either an essentially linear hydrogenated butadiene homopolymer or a star-branched polymer, the arms of which are an essentially linear hydrogenated butadiene homopolymer, such hydrogenated butadiene polymer containing from about 20 to about 90% of polymerized butadiene units with the 1,2-microstructure and having a polydispersity index (P.I.) of about 1.01 to 1.50. The compositions have a superior combination of processing and mechanical properties such as flexural strength, impact resistance, and melt flow.

13 Claims, No Drawings

ELASTOMER - MODIFIED THERMOPLASTIC OLEFIN POLYMER COMPOSITIONS

BACKGROUND OF THE INVENTION

1. Field of the Invention

This invention relates to thermoplastic olefin polymer compositions modified by any of a class of specific elastomers.

2. Background Information Including Description of Related Art

Thermoplastic olefin polymers such as crystalline isotactic propylene polymers prepared by means of Ziegler-Natta coordination catalysts have found wide acceptance in recent years in applications such as containers, pipes and various molded articles, e.g., various household articles such as kitchenware and toys, because of their cheapness and generally satisfactory combination of properties such as mechanical strength, chemical resistance and ease of processability.

In more recent years various properties of these olefin polymers, e.g., flexural strength, impact resistance, and processability, have been further improved by blending the olefin polymer with certain elastomers, the most commercially utilized of which are uncrosslinked ethylene-propylene copolymers (EPM) and crosslinked ethylene-propylene-diene copolymers (EPDM). Despite the improvement in properties effected by these blends, there exist applications of olefin polymers such as crystalline propylene polymers for which the use of alternate blending elastomers, which may result in improvements in properties such as melt flow rate, elongation at yield and at break, softness, flexibility and low temperature impact resistance, would be advantageous.

The following prior art references disclose olefin polymers containing any of various polymeric additives.

U.S. Pat. No. 3,985,826, issued Oct. 12, 1976 to Futamura, discloses as blending agents for polyolefins hydrogenated block copolymers of butadiene and isoprene containing at least five alternating blocks of polymers of the two monomers.

U.S. Pat. No. 4,880,878, issued Nov. 14, 1989 to Himes et al., teaches thermoplastic blends of a polyolefin such as polyethylene and two block polymers having the configuration A-B-A wherein the A blocks are a polymerized monoalkenyl aromatic hydrocarbon such as styrene and the B blocks are a hydrogenated polybutadiene which in one block polymer contains about 35 to 55 mol. % of polymerized butadiene units having the 1,2-microstructure and in the other block polymer contains about 18 to 34 mol. % of polymerized butadiene units with the 1,2-microstructure.

U.S. Pat. No. 4,968,747, issued Nov. 6, 1990 to Mallikarjun, discloses compatibilized thermoplastic resin compositions comprising a crystalline propylene polymer, a random styrenic copolymer comprising a polymerized dicarboxylic acid derivative, an elastomeric olefin polymer which may be an ethylene-propylene copolymer, an ethylene-propylene-diene terpolymer, or a hydrogenated monovinyl aromatic monomer/conjugated diene block copolymer, and an epoxy-containing olefinic polymer.

U.S. Pat. No. 5,023,300 issued Jun. 11, 1991 to Huff et al., teaches thermoplastic olefin alloys comprising an olefin copolymer elastomer (OCE) which may be a copolymer of ethylene and a $C_3$ to $C_{10}$ alpha-olefin such a propylene or 1-butene, a random copolymer of propylene (RCP) and another monoolefin such as ethylene, and optionally polypropylene.

U.S. Pat. No. 5,034,449, issued Jul. 23, 1991 to Mallikarjun, discloses polyblend compositions comprising an olefin polymer, e.g., a crystalline propylene polymer, a rubber modified styrenic resin, e.g., a styrene/maleic anhydride copolymer to which has been grafted an ethylene-propylene-diene monomer (EPDM) rubber or a conjugated diene rubber such as a homopolymer of butadiene, and a compatibilizer which may be a hydrogenated monovinyl aromatic monomer/conjugated diene block copolymer.

SUMMARY OF THE INVENTION

In accordance with this invention, there are provided improved thermoplastic resin compositions comprising a crystalline propylene polymer and as a modifying elastomer, an essentially linear hydrogenated butadiene homopolymer or a star branched polymer in which the arms of the polymer are each an essentially linear hydrogenated butadiene homopolymer, said hydrogenated butadiene homopolymer in either case containing from about 20 to about 90% of polymerized butadiene units having the 1,2-microstructure, and said modifying elastomer having a polydispersity index (P.I.) of about 1.01 to about 1.50.

The compositions of this invention have been found to have a particularly desirable combination of various properties, e.g., melt flow rate, elongation at break and yield, tensile strength, flexibility, softness and low temperature impact resistance.

DESCRIPTION OF THE PREFERRED EMBODIMENTS

The crystalline propylene polymer contemplated under this invention may be either a homopolymer of propylene or a copolymer of propylene with a minor amount (preferably, from about 1 to 10 wt. %) of another olefin such as ethylene, 1-butene, 4-methyl-1-pentene, 1-hexene, 1-octene, and the like. The polymer is normally solid and isotactic, i.e., contains greater than 90% hot heptane insolubles, and has a melt flow rate (MFR) of from about 0.1 to about 100 g/10 minutes. As is known, such propylene polymers are normally crystalline with a density range from about 0.89 to about 0.91 g/cc. Preferably, a propylene polymer having a MFR between about 0.2 to about 15.0 is employed. The apparent crystalline melting point of the crystalline propylene polymer is preferably from about 140° C. to 180° C.; it is not necessary for this component to be completely crystalline (i.e. 100% isotactic). The number-average molecular weight of the crystalline propylene polymer is preferably above about 10,000 and more preferably is greater than about 50,000. Preferably, the crystalline propylene polymer is a crystalline propylene homopolymer.

The contemplated crystalline propylene polymers and methods for making them are well-known in the art and are readily available commercially from a number of manufacturers.

The essentially linear hydrogenated butadiene homopolymer or the star-branched polymer in which the arms are a hydrogenated butadiene homopolymer (hereinafter collectively referred to as the "hydrogenated butadiene polymer") has a low polydispersity index (P.I., defined as Mw/Mn, the ratio of weight average molecular weight Mw to number average molecular weight Mn, which is a measure of the molecular weight distribution of the polymer), generally in the range of about 1.01 to about 1.50 preferably about 1.01 to 1.25, with the number average molecular weight generally being in the range of about 1,000 to 2,000,000, preferably in the range of about 5,000 to 1,000,000. These molecular weight ranges define polymers which are liquid as well as solid at room temperature. The percentage of polymerized butadiene units in the hydrogenated butadiene polymer having a 1,2-microstructure is generally in the range of about 20 to 90%, preferably about 30 to 70%, with the remainder of the units having the 1,4-microstructure. On hydrogenation, the polymerized butadiene units having the 1,2-microstructure are converted to polymerized 1-butene units while the polymerized butadiene units having the 1,4-microstructure are converted to polymerized ethylene units.

Polymerization Process for the Butadiene Polymer

In order to obtain a hydrogenated butadiene polymer having a low P.I. as defined hereinbefore, the butadiene polymer prior to hydrogenation must generally be prepared by an anionic polymerization process. Anionic polymerization is well known in the art and is utilized in the production of a variety of commercial polymers. An excellent comprehensive review of the anionic polymerization processes appears in the text ADVANCES IN POLYMER SCIENCE 56, ANIONIC POLYMERIZATION, pp. 1–90, Springer-Verlag, Berlin, Heidelberg, New York, Tokyo 1984 in a monograph entitled ANIONIC POLYMERIZATION OF NON-POLARMONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as an organolithium compound, e.g, a lithium alkyl such as n-butyl-lithium, sec-butyl-lithium, or t-butyl-lithium, an organo sodium compound, e.g., sodium naphthalide, or an organo potassium compound, e.g., cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as pentane, hexane, cyclohexane or heptane, or aromatic solvents, such as benzene or toluene.

A preferred process, when using a lithium-based catalyst, comprises forming a solution of a polar compound and optionally the butadiene monomer in an inert hydrocarbon solvent such as n-pentane, titrating out the impurities in the solution, and adding the catalyst. If the butadiene is not added with the polar compound before the catalyst, it is added after the catalyst, preferably gradually to maintain a desired temperature and prevent overheating. One or more polar compounds may be used, which is generally selected from the group consisting of ethers, thioethers and tertiary amines. The polar compound is necessary to control the microstructure of the butadiene, i.e., the content of the 1,2-structure therein. The higher the content of the polar compound per unit mass of butadiene monomer, the higher will be the content of the 1,2-structure of the polymerized butadiene. Examples of specific polar compounds which may be used are tetrahydrofuran (THF), 1,2-diethoxyethane, dimethyl ether, diethyl ether, ethyl methyl ether, ethyl propyl ether, dioxane, diphenyl ether, tripropyl amine, tributyl amine, trimethyl amine, triethyl amine, and N-,N-,N'- N'-tetramethylethylenediamine (TMEDA). The amount of the polar compound depends on the type of the polar compound and the polymerization conditions as will be apparent to those skilled in the art. The effect of the polar compounds on the polybutadiene microstructure is detailed in ANTKOWIAK et al., TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319–1334 (1972), incorporated herein by reference. The polar compounds also accelerate the rate of polymerization.

The polymerization reaction is usually conducted at a temperature of between about 0° C. and about 200° C., preferably between about 30° C. and about 100° C. Control of a chosen reaction temperature is desirable since it can influence the effectiveness of the polar compound additive in controlling the polymer microstructure. The reaction pressure is not critical but is preferably sufficient to keep the monomer and solvent in the liquid phase, e.g., from atmospheric to about 100 psig. In one procedure for obtaining a linear butadiene polymer, after substantially all of the butadiene has been reacted to form living anionic linear butadiene polymer of the desired molecular weight, the reaction mixture is quenched with a compound such as 4-hydroxy-4-methyl-2-pentanone or acetic acid to destroy the anionic sites of the polybutadiene carbanions by exchanging hydrogen, which becomes bonded to the anionic carbon atom by a covalent bond, for the metal, e.g., lithium, cation. As is well known in the art, the molecular weight of the polymer resulting from anionic polymerization is determined by the catalyst to monomer, i.e., butadiene, molar ratio, while the percentage of polymerized butadiene units having the 1,2-microstructure is determined by 1) the reaction temperature, 2) the polar modifier type, and 3) the concentration of polar modifier. Thus by controlling these process variables, a butadiene polymer can be obtained having the desired molecular weight and percentage of 1,2-microstructure. The desired low P.I. is determined by the mechanism of anionic polymerization.

In an alternative method for making an essentially linear butadiene polymer, the anionic polymerization procedure described in the preceding paragraph is followed except that a catalyst to monomer ratio is selected to obtain a living anionic butadiene polymer having one half of the desired molecular weight. The living polymer is then coupled by means well-known in the art using a coupling agent, e.g., a monoester, $CO_2$, iodine or a dihaloalkane, effective in coupling two polymeric anionic units to yield an essentially linear butadiene polymer having the desired molecular weight.

As stated, the hydrogenated butadiene polymer, in addition to an essentially linear hydrogenated butadiene homopolymer, may also be a star-branched polymer wherein the arms or branches are each a linear hydrogenated butadiene homopolymer, with the requisite amount of polymerized units having the 1,2-microstructure. Consistent with procedures of making star-branched polymers which are well-known in the art, the star-branched butadiene polymers contemplated under this invention are made by not quenching the butadiene polymer living anions as described previously for the preparation of an essentially linear polymer, but rather contacting such living anions with a coupling agent capable of forming such star-branched polymers. Some coupling agents of this type are, for example, polyesters, polyepoxides, polyhaloalkanes, silicon halides such as silicon tetrachloride, divinyl benzene, alkyltrichlorosilanes and dialkyldichlorosilanes. The use of tri- or tetra-functional coupling agents, such as alkyltrichlorosilanes or silicon tetrachloride, permits the formation of macromolecules having three or four arms emanating from the coupling sites, respectively. The addition of divinyl benzene as a coupling agent has been documented to produce molecules having up to 20 or more separately joined segments. The molecular weight of the star-branched block copolymers will depend on the number of arms in each such copolymer, as will be apparent to those skilled in the art.

Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and British patents 1,014,999; 1,074,276; 1,121,978.

Hydrogenation

The butadiene polymer is substantially hydrogenated to saturate most of the residual double bonds of the polymerized butadiene units. The method of hydrogenating the butadiene polymer is similar to that of Falk, "Coordination Catalysts For The Selective Hydrogenation of Polymeric Unsaturation", JOURNAL OF POLYMER SCIENCE: PART A-1, Volume 9, 2617–2623 (1971), and may be conducted with the hydrogenation catalyst and process used herein. Any other known hydrogenation methods may also be used, as will be apparent to those skilled in the art, but it is preferred to use the method described herein. In summary, the hydrogenation method preferably used herein comprises contacting the previously prepared butadiene polymer with hydrogen in the presence of the preferred catalyst composition.

The preferred hydrogenation catalyst composition and hydrogenation process are described in detail in Application Ser. No. 07/466,136, filed Jan. 16, 1990, now abandoned by T. S. Coolbaugh et al., the entire disclosure of which pertaining to the nature and preparation of the catalyst is incorporated herein by reference. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyllithium, diethylzinc, di-n-propylzinc, triethylboron, diethylaluminum ethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is an alkylaluminum compound having 1 to about 6 carbon atoms per alkyl radical. Other reducing agents which can be used herein are disclosed in Stevens et al., U.S. Pat. No. 3,787,384, column 4, line 45 to column 5, line 12 and in Strobel et al., U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl-lithium, sec-butyl-lithium, n-hexyl-lithium, phenyl-lithium, triethylaluminum, tri-isobutylaluminum, trimethylaluminum, diethylaluminum ethoxide, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the alkylalumium/nickel(II) systems the preferred aluminum: nickel molar ratio is about 2.5:1 to about 4:1; for the alkylaluminum/cobalt(II) systems the preferred aluminum: cobalt molar ratio is about 3:1 to about 4:1; and for the alkylaluminum/titanium(IV) alkoxides systems, the preferred aluminum: titanium molar ratio is about 3:1 to about 6:1.

The mode of addition and the ratio of the reducing agent to the transition metal compound are important in the production of the preferred hydrogenation catalysts having superior selectivity, efficiency and stability, as compared to prior art catalytic systems. During the synthesis of the hydrogenation catalysts, it is preferred to maintain the molar ratio of the reactants used to synthesize the catalyst substantially constant. This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive; accordingly, the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° C. and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvents used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 10–30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less stable and may be heterogeneous.

In the embodiment wherein the reducing agent is added as rapidly as possible to the transition metal compound, it is also important to add the reducing agent to the transition metal compound in the aforementioned sequence to obtain the preferred catalyst. The reversal of the addition sequence, i.e., the addition of the transition metal compound to the reducing agent, or the respective solutions thereof, is detrimental to the stability, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated butadiene polymer to be hydrogenated with an amount of the catalyst solution containing about 0.05 to about 0.5, preferably about 0.1 to about 0.3 mole percent of the transition metal based on moles of the polymer unsaturation.

The hydrogen partial pressure is about 5 psi to about several hundred psi, but preferably it is about 20 to about 100 psi. The temperature of the hydrogenation reaction mixture, without reference to the specific catalyst used, may also vary widely, e.g., from about 0° to about 150° C., preferably about 30° to 60° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infrared spectroscopy, hydrogen flow rate, total hydrogen consumption, or any combination thereof.

In addition to the previously described hydrogenation catalysts, other catalysts may be used which will accomplish the contemplated hydrogenation, e.g., heterogeneous supported catalysts such as nickel on kieselguhr.

After the hydrogenation reaction is completed, the hydrogenation catalyst should be removed from the polymer. If a soluble catalyst is used, its removal can be accomplished, for example, by washing the polymer solution twice with equal volumes of 10% aqueous citric acid solution also containing 5% isopropanol at 60° C. Insoluble catalysts, e.g., solid supported catalysts, can be removed by filtration. The polymer solution is then water washed and the polymer isolated by conventional methods, e.g., hot water, steam or alcohol flocculation or solvent evaporation.

For the purposes of this invention, at least about 75%, preferably at least 95% of the residual unsaturation of the butadiene homopolymer is generally hydrogenated.

The compositions of this invention may contain, for example, about 1 to 90 wt. %, preferably about 2 to 50 wt. % of hydrogenated butadiene polymer based on the total of the crystalline propylene polymer and the hydrogenated butadiene polymer. In addition to these two polymers, the composition may also contain any of various additives conventionally utilized in plastic molding and extrusion compositions, e.g., pigments, fillers, stabilizers, curing agents, antioxidants, lubricants such as mold release agents, ultra-violet screening agents, antistatic agents, nucleating agents, plasticizers, processing oils, etc. Curing agents are utilized if it is desired to vulcanize, i.e. crosslink, the hydrogenated butadiene polymer in the composition. The compositions may be prepared by intimately mixing the components in the form of granules and/or powder in a high shear blending operation at an elevated temperature using equipment such as high shear extrusion compounding machines, e.g., twin screw compounding extruders or thermoplastic extruders and the like.

The following examples further illustrate the invention.

EXAMPLE 1, ELASTOMER A

Eleven hundred milliliters (ml) of purified pentane was introduced under a nitrogen atmosphere into a two quart glass-bowled pressure reactor. The reactor was equipped with an air driven stirrer, a pressure gauge, a thermometer well, a heat exchange coil, a top surface inlet valve, a dip tube feeder with a valve, a syringe injection port containing a Viton rubber gasket, and a blow-out disk (200 psi). One ml of a 0.1M dipyridyl in cyclohexane solution was injected into the reactor along with 1.5 ml of anhydrous tetrahydrofuran. Butadiene (100.0 g, 161.3 ml) was then pressured into a 300 ml Hoke bomb. The bomb was fitted on top of the reactor and the contents were pressured into it. The solution was heated to 50° C. and titrated by slow addition of 1.6M n-butyllithium until an orangish color persisted. The catalyst, 0.729 ml of n-butyllithium, was added. Polymerization of the butadiene was maintained at 50°–52° C. for 3 hours. The living anion was then quenched by the addition of 0.73 ml (0.068 g) of 4-hydroxy-4-ethyl-2-pentanone. A portion of the polymer was isolated by flocculation in isopropanol containing Irganox 1076 and dried in a vacuum oven. Gel permeation chromatography (GPC) of the sample showed the polymer to have a number average molecular weight (Mn) and a weight average (Mw) of 93,400 and 97,100 respectively, and a polydispersity index (Mw/Mn) of 1.04. Infrared (FTIR) analysis showed the butadiene microstructure to have 36.5% 1,2- and 63.5% 1,4-microstructure.

Part of the polymeric solution (190 g) described in the previous paragraph was introduced into a 0.5-L Fischer-Porter reactor. The total amount of polymer added to the reactor was 22.8 g which represents 0.422 moles of butadiene unsaturation. The hydrogenation catalyst was prepared by adding 35.1 ml of a 1.7M triethylaluminum solution (59.6 mmol) to a solution of 19.7 mmol of cobalt octoate in 198.6 ml (119.2 g) of cyclohexane. The final catalyst solution was 0.1M in cobalt and had an aluminum-cobalt ratio of 3:1. A portion of this catalyst (3.0 ml, 0.30 mmol Co) was syringed into the reactor which had been purged/vented three times with nitrogen, then hydrogen, and pressured to 55 psig with hydrogen. The progress of the hydrogenation was monitored by infrared (FTIR) analysis of hourly samples. An additional 3.0 ml of catalyst was added: 1.0 ml after 2 h, 3 h, and 4.5 h from the starting time. The reaction was terminated after 6.25 h, when the IR showed no existing olefinic unsaturation. The catalyst was then removed by washing the polymer in a Waring blender with 600 ml of a 0.5M citric acid aqueous isopropanol (2:1 water-IPA) solution. The mixture was vigorously mixed at room temperature for 1–2 minutes and allowed to settle. The pink aqueous layer was removed and the entire wash step was repeated. After addition of 0.2 g of "Irganox 1076" hindered phenol stabilizer, the polymer was isolated by flocculation in isopropanol containing Irganox 1076 and dried in a vacuum oven. Gel permeation chromatography of the sample revealed little change in the polydispersity index of the polymer had occurred as a result of hydrogenation.

The hydrogenated linear butadiene homopolymer prepared as described in this example could be blended with a crystalline propylene polymer in amounts of from 20 to 90 wt. % of the total of the two polymers to yield blends having a superior combination of processability and physical properties.

LINEAR ELASTOMERS B TO E

Using a procedure similar to that described in Example 1, four different hydrogenated essentially linear butadiene homopolymers were prepared with differing molecular weights and 1,2-microstructure contents for subsequent blending with a crystalline propylene homopolymer. The polymerization process for the four linear polymers was scaled up from that of Example 1 by using 1382 grams of butadiene and 13.1 L of n-pentane solvent in a 5 gallon reactor with the concentrations of catalyst and polar compound, and the polymerization reaction temperature adjusted to yield polymers having the desired molecular weight and 1,2-microstructure. In the preparation of elastomers B and C, N,N,N',N'-tetramethylethylenediamine (TMEDA) was used as the polar compound and in the preparation of elastomers D and E, tetrahydrofuran (THF) was used. The hydrogenation was carried out essentially as described in Example 1.

The number average molecular weight (Mn), polydispersity index (P.I.), and 1,2-microstructure content (1,2-Micr.) of the elastomer, the identity and concentration of the polar compound modifier (Pol. Mod.), the concentration of the n-butyllithium catalyst (BuLi) and the reaction temperature (Temp.) for each polymerization are shown in Table I.

TABLE I

| | Properties and Polymerization Conditions for Linear Elastomers B to E | | | | | | |
|---|---|---|---|---|---|---|---|
| Elastomer | Mn | P.I. | 1,2-Micr. % | Pol. Mod. | Pol. Mod. moles/L | BuLi moles/L | Temp., °C. |
| B | 79,000 | 1.01 | ≈90 | TMEDA | $1.42 \times 10^{-3}$ | $1.20 \times 10^{-3}$ | 30–35 |
| C | 220,000 | 1.01 | ≈90 | TMEDA | $1.42 \times 10^{-3}$ | $4.30 \times 10^{-4}$ | 30–35 |
| D | 85,000 | 1.02 | 38 | THF | $1.52 \times 10^{-2}$ | $1.14 \times 10^{-3}$ | 52–55 |
| E | 200,000 | 1.02 | 42 | THF | $1.69 \times 10^{-2}$ | $4.73 \times 10^{-4}$ | 52–55 |

STAR-BRANCHED ELASTOMER F

A 5-gallon reactor was charged with 13.1 L of purified pentane under an inert atmosphere. To the reactor was added 4.7 ml 2,2'-dipyridyl solution (0.1M) and 147 ml of anhydrous tetrahydrofuran via a Hoke bomb. The reactor contents were heated to 45C. and then titrated with 1.6M butyllithium until an orangish color persisted. Freshly distilled butadiene (1114.5 g, 1797.7 ml) was pressured into the reactor. The catalyst n-butyllithium (13.9 ml, 0.022 mol) was then added. The reaction temperature was maintained at 50C. for three hours. A sample was withdrawn from the reactor and later the Mn of the material was found to be 46,000. Next, 22.8 g (24.9 ml) of divinylbenzene (78% pure) was added to the reactor. After heating at 50C. for 4 hours, 1.29 g (1.39 ml) of diacetone alcohol was added in 50 ml of pentane via a Hoke bomb. After 10 minutes the reactor was cooled and a sample was taken. The GPC of the material revealed an Mn of $6.0 \times 10^5$. The number of arms is calculated to be 13, since the Mn of the arm length was measured to be 46,000 (Mw/Mn=1.01). An infrared analysis (FTIR) showed the polymerized butadiene units to have 62% 1,2- and 38% 1,4-microstructure.

The star-branched elastomer prepared as described in the preceding paragraph was hydrogenated in the same manner described in Example 1. The entire polymer cement was transferred to a 10 gallon reactor for hydrogenating. The reactor was pressured with hydrogen and then it was released several times. The hydrogenation catalyst used was prepared by adding 351 ml of a 1.7M diethylaluminum ethoxide solution (596 mmol) to a solution of 197 mmol of cobalt octoate in 1986 ml (1192 g) of cyclohexane. The final catalyst was 0.1M in cobalt and had an aluminum-cobalt ratio of 3.0:1. The cobalt ethoxide catalyst (316 ml) was added to a Hoke bomb and the contents were then pressured into the reactor. The reaction temperature was maintained at 35–40C. and infrared was used to monitor the disappearance of the unsaturation. When <0.3–0.5% residual unsaturation remained, the reaction was terminated. The catalyst was removed in the same type of washing procedure described in Example 1. The GPC showed little change in the polydispersity index and the Mn of the material.

STAR-BRANCHED ELASTOMER G

This elastomer was prepared in the same manner as star-branched elastomer F except that 24.9 ml of tetrahydrofuran were used. The Mn of the polymer was $1.10 \times 10^6$; the Mn of the arm length was 49,000 (Mw/Mn=1.10); and the number of arms was 22. Infrared analysis showed a 1,2- and 1,4-microstructure of 38% and 62% respectively. This material was hydrogenated in the same manner as Elastomer F.

EXAMPLES 2 TO 7

Blends were prepared containing 80 wt. % of "Profax 6323" crystalline isotactic propylene homopolymer having a melt flow rate of 9.8, a density of 0.903 and a melting point of 168° C., and 20 wt. % of each of elastomers B to G described previously. Values were determined of various physical properties of the blends listed below together with the ASTM designation of the methods used to determine such properties.

| Physical Property | ASTM Method |
|---|---|
| Melt Flow Rate, g/10 min | 1238-90b |
| Tensile Strength, psi (20"/min) | D 638-90 |
| Tensile Elongation @ Break | D 638-90 |
| Tensile Elongation @ Yield | D 638-90 |
| Flexural Modulas, PSI | D 790-90 |
| Flexural Strength, PSI | D 790-90 |
| Gardner Impact, R.T. | D 3029-90 |
| Gardner Impact, –30 C. | D 3029-90 |
| Shore D Durometer Hardness | D 2240-91 |

The results are shown in Table II.

TABLE II

| Physical Property | Example (Elastomer) | | | | | |
|---|---|---|---|---|---|---|
| | 2(B) | 3(C) | 4(D) | 5(E) | 6(F) | 7(G) |
| MFR g/10 min | 7.2 | 4.2 | 4.4 | 3.3 | 4.6 | 2.2 |
| Tensile Str., psi | 2830 | 2450 | 3530 | 3460 | 2960 | 3330 |
| % Elon. at Break | 770 | 770 | 170 | 210 | 760 | 180 |
| % Elon. at Yield | 37 | 43 | 25 | 21 | 32 | 17 |
| Flex. Mod., psi | 74920 | 64470 | 138350 | 135960 | 95560 | 139210 |
| Flex. Str., psi | 1440 | 1240 | 2580 | 2500 | 1790 | 2570 |
| Gardner, RT, J | >36 | >36 | >36 | >36 | >36 | >36 |
| Gardner, –30° C., J | 0.5 | 0.5 | >36 | >36 | 30.1 | 35.3 |
| Shore D | 64 | 65 | 65 | 67 | 63 | 65 |

As shown in Table II, the blends have relatively high flow rates and several of them (Examples 2, 3 and 6) have very high elongations at yield and at break. Moreover, they are relatively soft and flexible as indicated by the flexural modulus and flexural strength results.

EXAMPLES 8 TO 11

Blends were prepared of 50 parts by weight of "Profax 6323" crystalline isotactic propylene homopolymer and 50 parts by weight of each of linear elastomers E and D and star-branched elastomers G and F, each blend also containing 10 parts by weight of "Atomite" finely ground calcium carbonate filler, 0.2 part by weight of "Irganox" 1010" hindered phenol stabilizer and 0.1 part by weight of calcium stearate mold release agent. The blends were tested for the same physical properties as the blends of Examples 2 to 7. The results are shown in Table III.

TABLE III

| Physical Property | Example (Elastomer) | | | |
|---|---|---|---|---|
| | 8(E) | 9(D) | 10(G) | 11(F) |
| MFR g/10 min | 1.3 | 4.7 | 0.6 | 5.6 |
| Tensile Str., psi | 2260 | 2150 | 2260 | 2040 |
| % Elon. at Break | 280 | 230 | 160 | >1000 |
| % Elon. at Yield | 90 | 90 | 70 | 100 |
| Flex. Mod., psi | 60180 | 61910 | 73790 | 23820 |
| Flex. Str., psi | 1070 | 1060 | 1250 | 450 |
| Gardner, RT, J | >36 | >36 | >36 | >36 |
| Gardner, –30° C., J | >36 | >36 | >36 | >36 |
| Shore D | 42 | 53 | 47 | 47 |

All the blends of these examples were thermoplastic elastomers (TPE's) that are relatively soft and flexible as evidenced by the Shore D results and the flexural modulus and strength properties respectively. For certain applications such as automotive interior parts and children's toys, these properties would be highly desirable. Furthermore, the blends of Examples 9 and 11 had particularly high melt flow rates and that of Example 11 also had a surprisingly high elongation at break and at yield.

We claim:

1. A thermoplastic composition comprising a crystalline isotactic propylene polymer and as a modifying elastomer, an unfunctionalized hydrogenated butadiene polymer which is either an essentially linear hydrogenated butadiene homopolymer or a star-branched polymer, the arms of which are an essentially linear hydrogenated butadiene homopolymer, said hydrogenated butadiene polymer containing from about 20 to about 90% of polymerized butadiene units with the 1,2-microstructure and having a polydispersity index (P.I.) of about 1.01 to 1.50, said essentially linear butadiene homopolymer prior to hydrogenation having been prepared by anionic polymerization in which the anionic sites of butadiene homopolymer carbanions are destroyed by quenching with a compound which exchanges hydrogen for a metal cation, or by contacting butadiene homopolymer carbanions with a coupling agent effective to couple two of said carbanions to yield an essentially linear polymer, said star-branched polymer prior to hydrogenation having been prepared by anionic polymerization in which butadiene homopolymer carbanions are contacted with a coupling agent capable of forming said star-branched polymer.

2. The composition of claim 1 wherein said hydrogenated butadiene polymer contains about 30 to 70% of the 1,2-microstructure.

3. The composition of claim 1 wherein said hydrogenated butadiene polymer has a P.I. of about 1.01 to 1.25.

4. The composition of claim 1 wherein said hydrogenated butadiene polymer is an essentially linear hydrogenated butadiene homopolymer.

5. The composition of claim 1 wherein said hydrogenated butadiene polymer is a star-branched polymer in which the arms are an essentially linear hydrogenated butadiene homopolymer.

6. The composition of claim 1 wherein at least about 75% of the residual unsaturation of said butadiene polymer is hydrogenated.

7. The composition of claim 6 wherein said percentage is at least about 95%.

8. The composition of claim 1 containing from about 1 to 90 wt. % of said hydrogenated butadiene polymer based on the total of said two recited polymers.

9. The composition of claim 8 wherein said percentage is from about 2 to 50 wt. %.

10. The composition of claim 1 wherein said propylene polymer is a homopolymer.

11. The composition of claim 1 wherein said hydrogenated butadiene polymer is crosslinked.

12. The composition of claim 1 wherein said coupling agent effective to couple two of said butadiene homopolymer cations to yield said essentially linear butadiene homopolymer is a monoester, $CO_2$, iodine or a dihaloalkane.

13. The composition of claim 1 wherein said coupling agent capable of forming said star-branched polymers is selected from the group consisting of polyesters, polyepoxides, polyhaloalkanes, silicon halides, divinyl benzene, alkyltrichlorosilanes and dialkyldichlorosilanes.

* * * * *